United States Patent [19]
Walker et al.

[11] Patent Number: 5,798,508
[45] Date of Patent: Aug. 25, 1998

[54] POSTPAID TRAVELER'S CHECKS

[75] Inventors: Jay S. Walker, Ridgefield; T. Scott Case, Darien, both of Conn.

[73] Assignee: Walker Asset Management, L.P., Stamford, Conn.

[21] Appl. No.: 762,128

[22] Filed: Dec. 9, 1996

[51] Int. Cl.$^6$ .............................. G06F 15/30; G06K 5/00
[52] U.S. Cl. .......................... 235/380; 235/379; 283/58; 283/59
[58] Field of Search .................... 235/379, 380; 283/58, 59

[56] References Cited

U.S. PATENT DOCUMENTS

| | | | |
|---|---|---|---|
| 3,594,727 | 7/1971 | Br | 235/379 |
| 3,617,638 | 11/1971 | Jochimsen et al. | 379/91.01 |
| 3,697,693 | 10/1972 | Deschenes et al. | 705/38 |
| 3,950,015 | 4/1976 | Shrock | 283/70 |
| 4,997,188 | 3/1991 | Nilssen | 705/14 |
| 5,426,281 | 6/1995 | Abecassis | 235/379 |
| 5,546,523 | 8/1996 | Gatto | 235/380 |
| 5,686,713 | 11/1997 | Rivera | 235/380 |

*Primary Examiner*—Donald T. Hajec
*Assistant Examiner*—J. Eisenberg
*Attorney, Agent, or Firm*—Morgan & Finnegan, L.L.P.; Jeffrey L. Brandt

[57] ABSTRACT

A system and method for issuing and clearing traveler's checks that are paid for by credit card. A quantity of traveler's checks having a total value are sold to a buyer. An account identifier is received from the buyer. A lock is placed against the identified account for a lock value of at least a portion of the total value. Preferably, the identified account is a credit card account. The lock value and the credit card account number are communicated to a credit card clearing house and an authorization that a lock equal to the lock value has been placed against the credit card account is then received from the credit card clearing house. Information identifying the credit card account of the buyer of each traveler's check that is sold is communicated to the traveler's check issuer, which stores the information in a database. When the buyer cashes a traveler's check, the traveler's check issuer obtains payment on the check. The identified account is debited while the lock on the account is reduced by a generally equal amount. A predetermined value based on the value of the cashed traveler's check is communicated to the credit card clearing house, which debits the account, reduces the lock and communicates a payment credit to the traveler's check issuer.

44 Claims, 16 Drawing Sheets

TRAVELER'S CHECK DATABASE 224

| | SERIAL NUMBER 302 | STATUS 304 | FACE VALUE OF CHECK 306 | CUSTOMER ID 308 | RESELLER ID 310 | MERCHANT BANK ID 312 | EXPIRATION DATE 314 | PERCENTAGE FEE 316 |
|---|---|---|---|---|---|---|---|---|
| 320a | 1247002 | UNCASHED | $US 20 | 1234-5678-4321-8765 | 9876-4532 | UNCASHED | 1/1/2001 | 1% |
| 320b | 1247003 | UNCASHED | $US 20 | 1234-5678-4321-8765 | 9876-4532 | UNCASHED | 1/1/2001 | 1% |
| 320c | 1247004 | CASHED | $US 50 | 1234-5678-4321-8765 | 9876-4532 | 3456-3453 | 1/1/2001 | 1% |
| 320d | 1247005 | CASHED | $US 50 | 1234-5678-4321-8765 | 9876-4532 | 3489-2314 | 1/1/2001 | 1% |
| | | | | | | | | |
| | | | | | | | | |

FIG. 3

CUSTOMER DATABASE 226

| | CUSTOMER ID (CREDIT CARD NUMBER) 402 | CREDIT CARD EXPIRATION DATE 404 | RESELLER ID 406 | AMOUNT OF UNCLEARED CHECKS 408 | CREDIT CARD LOCK DATE 410 | LOCK AUTHORIZATION 412 | EXPIRATION DATE 414 | PERCENTAGE FEE 416 |
|---|---|---|---|---|---|---|---|---|
| 420a | 1234-5678-4321-8765 | 9/99 | 9876-4532 | $US 40 | 4/15/96 | 24752 | 1/1/2001 | 1% |
| 420b | 4356-2375-1996-8723 | 10/97 | 3456-3453 | $US 320 | 10/22/96 | 32456 | 1/1/2001 | 1% |
| | | | | | | | | |
| | | | | | | | | |

FIG. 4

SELLER/RESELLER DATABASE 228

| ID NUMBER 502 | NAME 504 | CONTACT PERSON 506 | CONTACT PHONE NUMBER 508 |
|---|---|---|---|
| 9876-4532 | RIDGEFIELD SAVINGS BANK | RALPH WALACE | 203-555-2231 |
| 3456-3453 | LONDON BANK AND TRUST | JANE MONTGOMERY | 011-44-555-1212 |
| | | | |
| | | | |

POSTPAID TRAVELER'S CHECKS

FIELD OF THE INVENTION

The present invention relates to a financial communication and database system and methods of operation of the system to issue, distribute and clear traveler's checks that are paid for after use.

BACKGROUND OF THE INVENTION

Traveler's checks are well-known payment means offering several advantages, such as security, convenience and wide acceptance. However, traveler's checks have the disadvantage that a purchaser must pay for the traveler's checks at the time of purchase. It may be some time before the purchaser uses the checks. In the meantime, the check issuer has the use of the purchaser's money. The value of this use is so significant that, in general, the primary source of issuer revenue from traveler's checks is the use of the purchaser's money. It would be advantageous to allow the purchaser to pay for a traveler's check only upon use of the check, thus allowing the purchaser to retain the use of his own money.

Credit cards are another well-known payment means. Credit cards allow a cardholder to retain the use of their own money not only up to the time of use, but for some time beyond the time of use. Indeed, a cardholder retains the use of his money until he actually pays his credit card bill, which may be for a grace period as long as several months after use of the card. The payment time may be further extended if the cardholder is willing to pay finance charges to the card issuer. However, credit cards are much less widely accepted than are traveler's checks. Many establishments that do not accept credit cards do accept traveler's checks. A need arises for a payment means which has the payment advantages of credit cards, but the widespread acceptance of traveler's checks.

SUMMARY OF THE INVENTION

The present invention is a system and method for issuing and clearing traveler's checks that are not paid for until they are used. Such traveler's checks have the widespread acceptance of conventional traveler's checks, but provide the purchaser with the use of his money until the checks are cashed.

A quantity of traveler's checks having a total value are sold to a buyer. An account identifier is received from the buyer. A lock is placed against the identified account for a lock value of at least a portion of the total value. The lock value and the account number are communicated to a financial clearing house and an authorization that a lock equal to the lock value has been placed against the account is then received from the financial clearing house. Information identifying the account of the buyer of each traveler's check that is sold is communicated to the traveler's check issuer, which stores the information in a database. Preferably, the identified account is a credit card account.

When the buyer cashes a traveler's check, the traveler's check issuer obtains payment on the check. The identified account is debited while the lock on the account is reduced by a generally equal amount. A predetermined value based on the value of the cashed traveler's check is communicated to the financial clearing house, which debits the account, reduces the lock and communicates a payment credit to the traveler's check issuer.

BRIEF DESCRIPTION OF THE DRAWINGS

The details of the present invention, both as to its structure and operation, can best be understood by referring to the accompanying drawings, in which like reference numbers and designations refer to like elements.

FIG. 2b is a block diagram of an issuer central controller system 200, according to the present invention, as is shown in FIG. 2a.

FIG. 2c is an exemplary block diagram of a seller terminal 254 or merchant bank terminal 252, shown in FIG. 2a.

FIG. 3 is an exemplary format of a traveler's check database 224 of FIG. 2b.

FIG. 4 is an exemplary format of a customer database 226 of FIG. 2b.

FIG. 5 is an exemplary format of a seller database 228 of FIG. 2b.

FIG. 6a is a flow diagram of a traveler's check sales process 600, implemented in the system of FIG. 2a.

FIGS. 6b and 6c are a flow diagram of a database management process 650, implemented in the system of FIG. 2a.

FIG. 7a is a flow diagram of steps 702–716 of traveler's check clearing process 700, implemented in the system of FIG. 2a.

FIG. 7b is a flow diagram of steps 718–734 of traveler's check clearing process 700, implemented in the system of FIG. 2a.

FIG. 8 is a flow diagram of one embodiment of a merchant check acceptance process 800, implemented in the system of FIG. 2a.

FIG. 9 is a flow diagram of a periodic service fee assessment process 900, implemented in the system of FIG. 2a.

FIG. 10 is a flow diagram of a postpaid traveler's check purchasing process 1000, implemented in the system of FIG. 2a.

DETAILED DESCRIPTION OF THE INVENTION

Figure 1A:
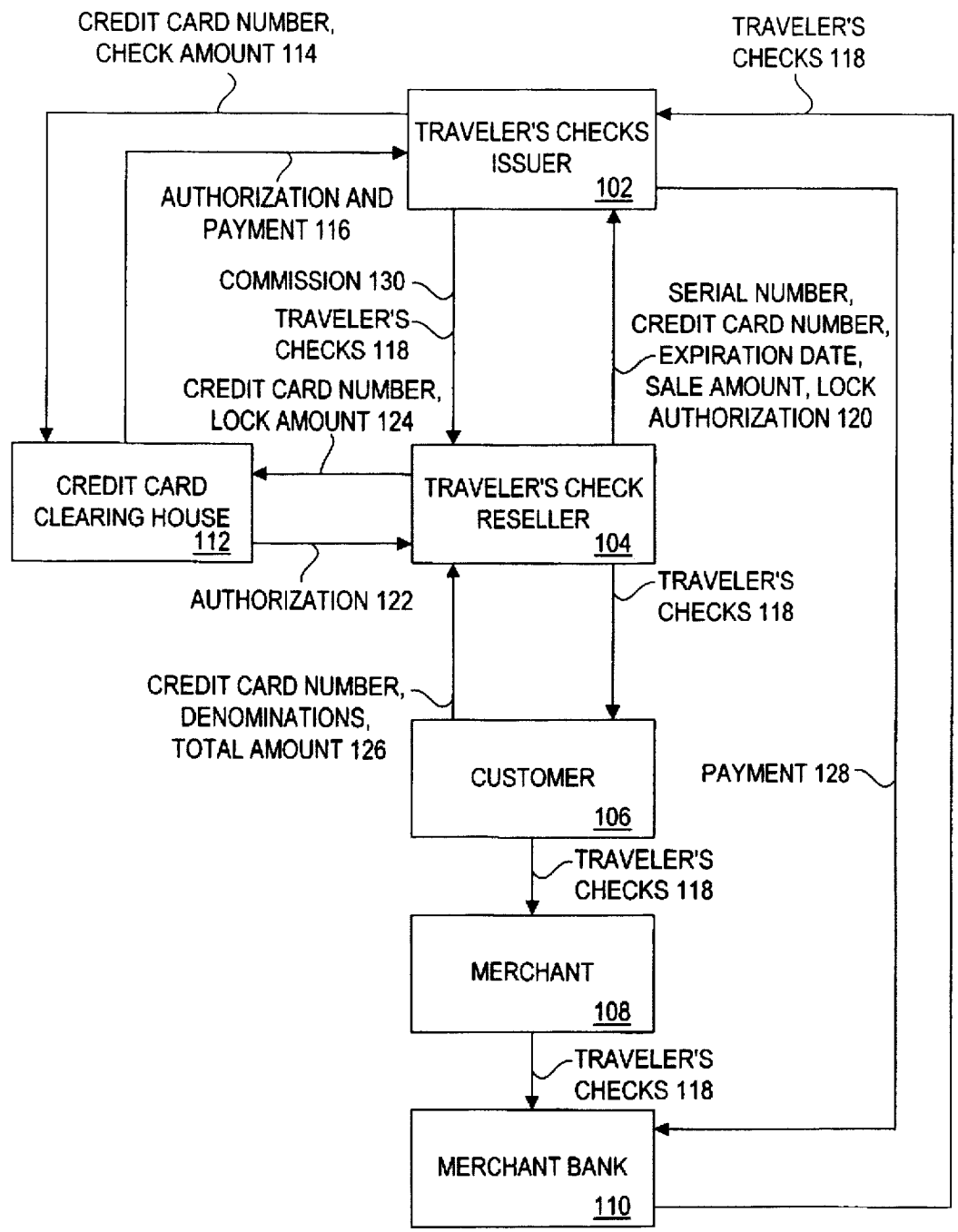
FIG. 1a is a data flow diagram of the issuance, use and clearing of a postpaid traveler's check, according to the present invention.

The data flow of the issuance, use and clearing of a traveler's check, according to one embodiment of the present invention, is shown in FIG. 1a. Traveler's checks are well-known payment drafts issued by a bank or express company, signed by the purchaser at the time of purchase and again at the time of cashing as a security precaution. Well-known traveler's check issuers include American Express, Citibank, Thomas Cook, etc.

As shown in FIG. 1a, traveler's check issuer 102 generates postpaid traveler's checks 118 and provides them to traveler's check seller 104. In one embodiment, seller 104 is issuer 102 itself. In another embodiment, seller 104 is a reseller, which is one or more other organizations which receive checks from issuer 102 and resell the checks. In this embodiment, there are preferably a plurality of traveler's check sellers 104, such as banks or other financial institutions. A customer 106 would go to any business location of seller 104 and request that postpaid traveler's checks be issued to him in requested denominations having a specified total value 126. Customer 106 selects one or more credit cards to which the checks will be linked and provides the numbers to seller 104. Credit cards are a well-known way of making a purchase on credit and identify the credit account to which the purchase is charged. Seller 104 transmits the customer's credit card account number and the amount of traveler's checks purchased in a message 124 to credit card clearing house 112. A credit card clearing house is a well-known establishment that is maintained to settle mutual claims and accounts relating to credit cards, such as purchases, cash advances and payments on the accounts. Clearing house 112 verifies that the identified credit card possesses sufficient credit to cover the amount of traveler's checks purchased and places a lock on that amount.

As used herein, the term "lock" means the withholding of access to otherwise available credit, or the limiting of access to otherwise available funds, in an amount equal to the "lock value": This lock guarantees that sufficient credit and/or funds will be available to cover a charge by the authorized holder of the lock, up to the lock value and for the duration of the lock.

In a credit card system, a lock is instituted through a credit card clearinghouse, and operates to reserve an amount of credit from an available credit line. This reserved credit can only be released to the merchant holding the authorization for the lock.

In a conventional bank account system, the lock is instituted through the bank (or other account holder) and operates to place a hold or freeze against a value of funds equal to the lock value. Again, for the duration of the lock, these funds are only released to the merchant having the lock authorization.

Although the credit lock prevents customer 106 from using a portion of the credit line of the credit card, the customer has not been charged for the checks and retains full use of the funds represented by the checks. Clearing house 112 then transmits purchase authorization 122 to seller 104. Upon receipt of authorization 122, seller 104 delivers traveler's checks 118 to customer 106 and transmits a message 120 including the credit card account number used, the sale amount, lock authorization, and the lock amount to traveler's check issuer 102.

Upon receipt of message 120, issuer 102 records information relating to customer 106 and to each check delivered to customer 106 in a database system. The credit card account number is used to identify customer 106, while the unique serial number preprinted on each check is used to identify each check. A service fee per check is charged to the customer's credit card. This fee may be a one-time charge and/or may also be a periodic charge assessed for the open availability of unredeemed postpaid traveler's checks. Issuer 102 then transmits commission 130 to seller 104.

Customer 106 takes possession of postpaid traveler's checks 118 in the same manner as conventional traveler's checks. In most cases, the customer is required to sign each check in the presence of an issuing agent. Customer 106 may retain possession of traveler's checks 118 for as long as desired. The customer's money is not being held or used by anyone else. There is a lock on a portion of the credit line of the credit card used to purchase the traveler's checks. Eventually, customer 106 uses one or more traveler's checks 118 at merchant 108. In one embodiment, postpaid checks look identical to conventional checks. From a merchant perspective, they are no different and carry no additional element of risk. Further, they are not subject to the discount rate typically assessed a merchant for accepting credit card payments. Customer 106 uses the checks by countersigning and transferring them to merchant 108. In one embodiment, this procedure is identical to that for conventional traveler's checks, thus ensuring that postpaid traveler's checks are as widely accepted as conventional traveler's checks.

Merchant 108 deposits the countersigned checks at its bank, merchant bank 110. Merchant bank 110 forwards the checks 118 to traveler's check issuer 102 for clearing and payment 128. Issuer 102 accesses its database using the serial numbers of the checks received and retrieves the credit card account number used to purchase each received check. For each check, a message 114 including the credit card account number and the check amount is transmitted to credit card clearing house 112. Clearing house 112 charges the check amount to the indicated credit card account number, decreases the lock amount accordingly and transmits authorization and payment 116 to issuer 102. Issuer 102 then transmits payment 128 to merchant bank 110.

While the present invention is described wherein the customer 106 purchases traveler's checks 118 using a credit card, it will be appreciated that any appropriate buyer account may be used in lieu of a credit card account. For example, a conventional bank savings account may be identified by customer 118, with a lock placed against the account by the managing financial institution. Further alternatives include, but are not limited to, checking accounts, money market accounts, and even frequent flyer mileage accounts of the type maintained by airlines.

In an alternate embodiment, where traveler's check issuer 102 and traveler's check reseller are separate entities, communications with clearing house 112 regarding the placement of the credit lock may be handled by issuer 102.

Figure 1B:
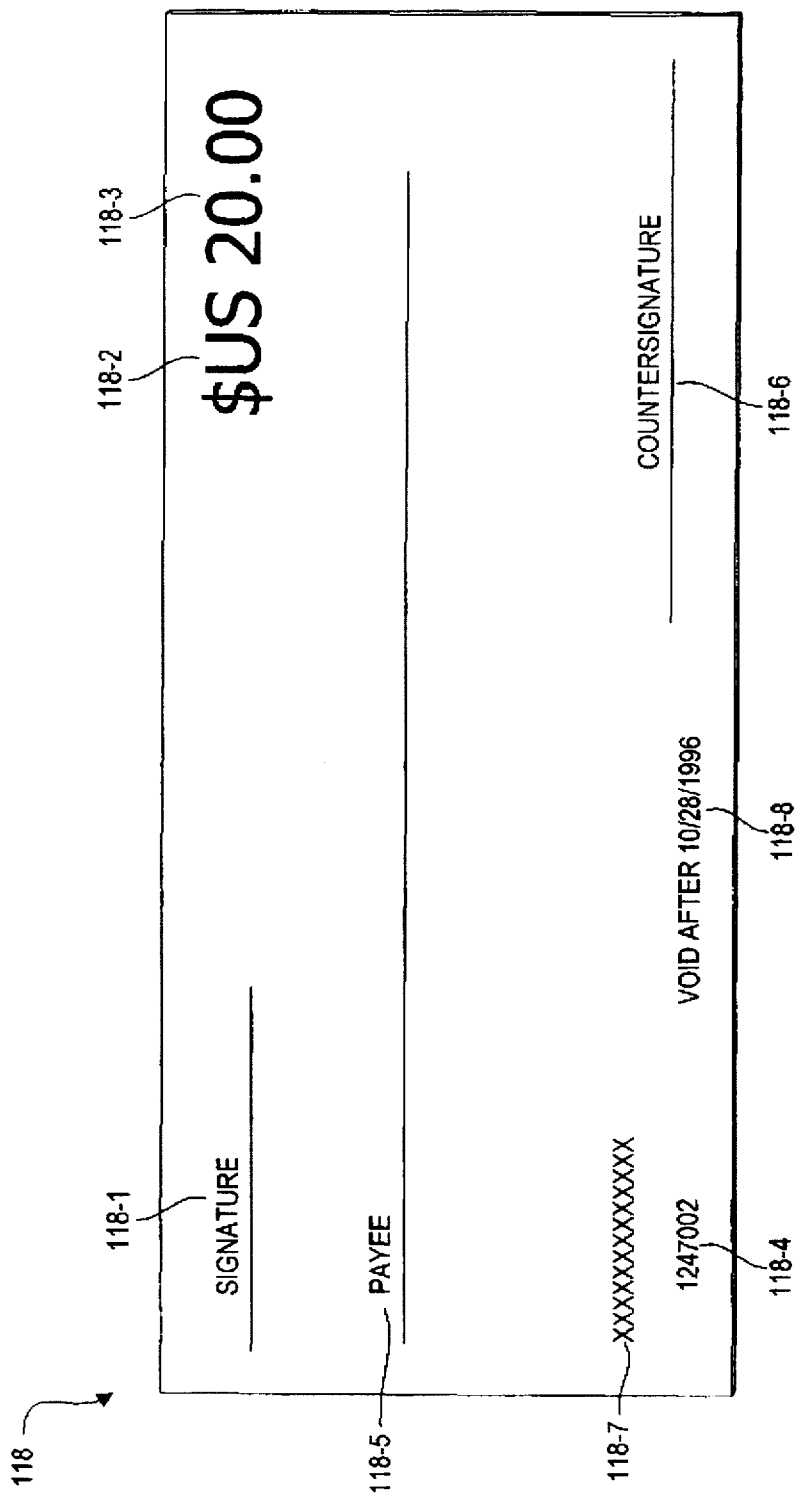
FIG. 1b is an exemplary diagram of a postpaid traveler's check, according to the present invention.

A postpaid traveler's check 118 according to the present invention is shown in FIG. 1b. Check 118, which is conventional in most respects, includes an original signature 118-1 of the customer, a countersignature 118-6, a denomination 118-2 and face value 118-3, a payee field 118-5, a serial number 118-4, an optional account number field 118-7 and an optional expiration date field 118-8. Original signature 118-1 is inscribed in the presence of a seller's agent. Countersignature 118-6 is inscribed by the customer upon use. A payee, which is typically the merchant that is accepting the check is entered in payee field 118-5, either by the customer or by the merchant. A denomination 118-2, face value 118-3 and serial number 118-4 are preprinted on the check by the issuer.

In accordance with the present invention, data is optionally entered in account number field 118-7 by the traveler's check seller. This data may be any identifying information desired. For example, the credit card account number of the customer may be entered in this field, either in plain-text or in an encrypted format.

Further, in accordance with the present invention, an expiration date is optionally entered in expiration date field 118-8 by the traveler's check seller. The traveler's check seller may enter an expiration date on checks so as to limit periodic charges assessed for the open availability of unredeemed postpaid traveler's checks. The expiration date may be based on a predetermined period from the date of purchase, such as six months or a year, or on a date specified by the customer, after which the checks will no longer be needed.

Figure 2A:
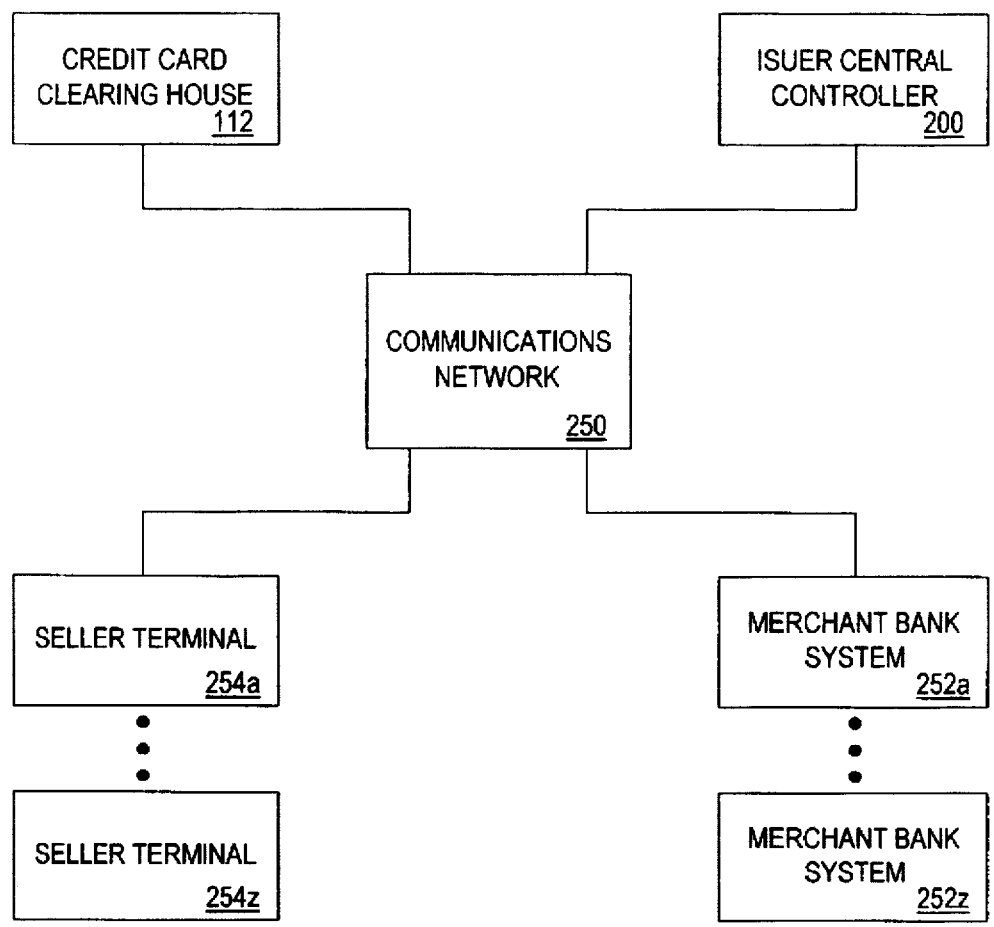
FIG. 2a is a block diagram of a postpaid traveler's check sales and clearance system, according to the present invention.

A system for issuing, distributing and clearing postpaid traveler's checks is shown in FIG. 2a. The system includes issuer central controller 200, which is a communication and database system maintained by traveler's check issuer 102 of FIG. 1a, credit card clearing house 112, communications network 250, a plurality of seller terminals 254a–z, and a plurality of merchant bank terminals 252a–z. Communications network 250 provides communications between the other elements of the system. Network 250 is preferably the public switched telephone network, but in other embodiments may be the Internet (with appropriate security measures) or a private wide-area network. Issuer central controller 200 communicates traveler's check sales information with seller terminals 254, authorization and payment information with credit card clearing house 112, and payment information with merchant bank systems 252. Issuer central controller 200 also stores this information for later use. Seller terminals 254 communicate sales information with issuer central controller 200 and sales and authorization information with credit card clearing house 112. Merchant bank systems 252 communicate payment information with issuer central controller 200.

Figure 2B:
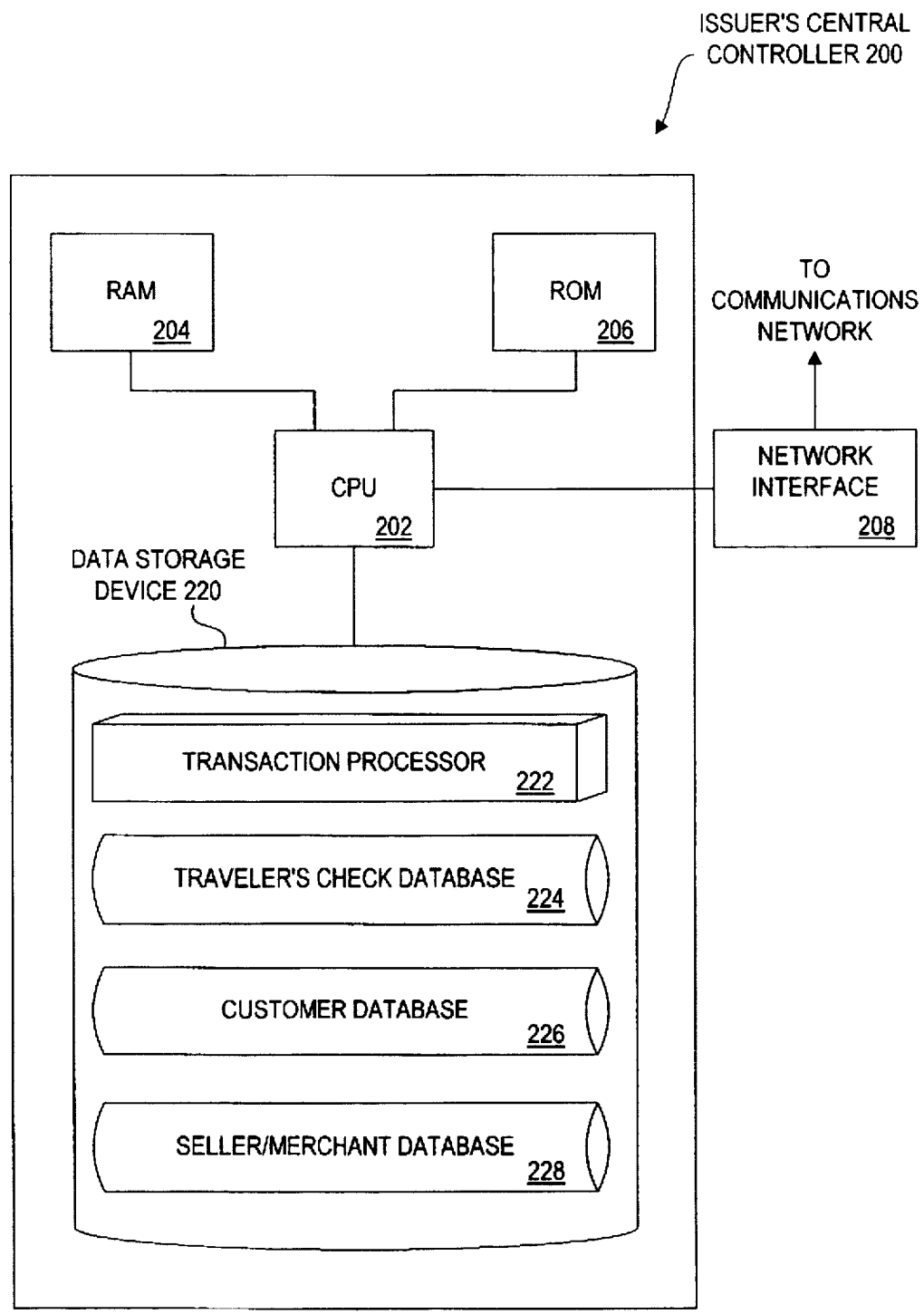

An exemplary issuer central controller system 200 is shown in FIG. 2b. Controller 200 includes central processing unit (CPU) 202, which is connected to random access memory (RAM) 204, read-only memory (ROM) 206, network interface 208 and storage device 220. CPU 202 may comprise a microprocessor, for example, an INTEL PENTIUM processor, or CPU 202 may comprise a minicomputer or mainframe processor. RAM 204 and ROM 206 store program instructions that are executed by CPU 202 and data that is used during program execution. Network interface 208, which couples controller 200 to communications network 250 and allows data communications with other elements comprising the present invention, may comprise, for example, a conventional modem or local/wide area network adapter. Storage device 220, which stores data that is used by the present invention, may comprise, for example, a magnetic disk and/or optical disk and may also comprise a magnetic tape.

Storage device 220 includes transaction processor 222, traveler's check database 224, customer database 226 and seller/merchant database 228. Transaction processor 222 accepts input from CPU 202, accesses the appropriate database and stores information in or retrieves information from that database. Transaction processor 222 may comprise a separate processor or may comprise a part of CPU 202. Traveler's check database 224 stores information about each traveler's check that is issued. Customer database 226 stores information about each customer who purchases a traveler's check. Seller/merchant database 228 stores information about each seller that sells traveler's checks or each merchant that accepts traveler's checks.

Figure 2C:
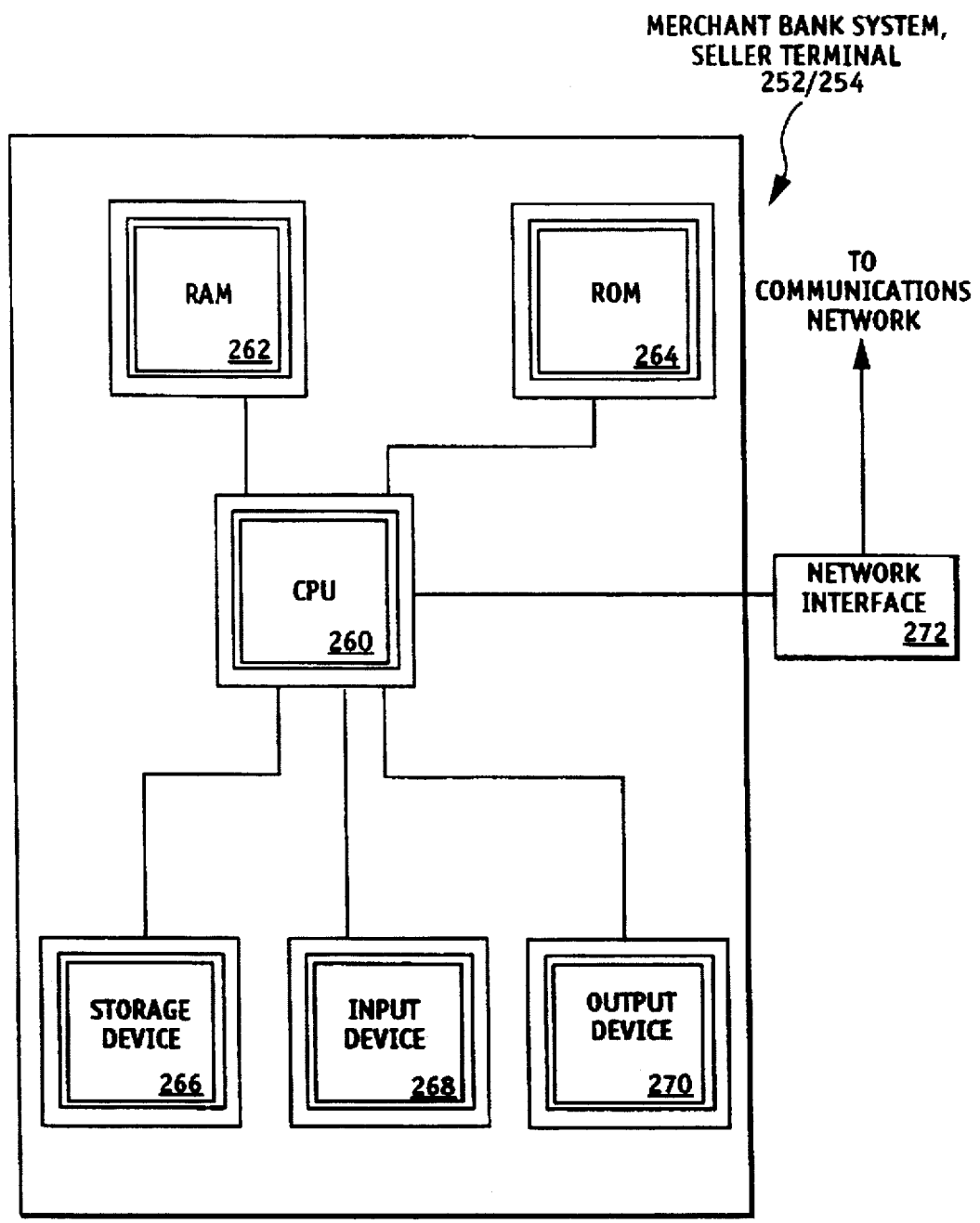

Information from traveler's check sellers, merchants and merchant banks may be communicated using a variety of devices. Typically, a communications terminal is used. The communications terminal may be implemented using a general-purpose computer system, such as a personal computer or minicomputer, or a dedicated terminal. An exemplary seller terminal 254 or merchant bank system 252 is shown in FIG. 2c. This figure is representative of either a general-purpose computer system or a dedicated terminal.

The system/terminal includes central processing unit (CPU) 260, which is connected to random access memory (RAM) 262, read-only memory (ROM) 264, network interface 272, storage device 266 and may include input device 268 and output device 270. RAM 262 and ROM 264 store program instructions that are executed by CPU 260 and data that is used during program execution. Network interface 272 couples the system/terminal to communications network 250, allowing data communications with other elements comprising the present invention. The implementation of network interface 272 depends upon the communication network used. For example, if the public switched telephone network is used, network interface 272 would be a modem or ISDN adapter. If a private wide-area network is used, network interface 272 would be a dedicated adapter compatible with the particular network selected.

Storage device 266 stores data which is used by the present invention. Input device 268 and output device 270 are included in seller terminal 254. The input and output devices allow information relating to postpaid traveler's checks which are being sold or cashed to be entered, for communication with issuer central controller 200 or credit card clearing house 112, and received information to be displayed.

In one embodiment, a customer at a traveler's check seller or merchant would interact with a human service representative who enters the appropriate information into a terminal device or would communicate the information over a telephone to an operator who enters the information into a terminal device or data entry terminal. In another embodiment, the customer would personally operate a terminal device similar to an automated teller machine (ATM). To purchase checks, the customer would insert a credit card into a card reader and receive the checks from an automated distribution device.

An exemplary format of a traveler's check database 224 is shown in FIG. 3. Database 224 includes a plurality of records, such as, for example, records 320a–d. Each record includes a serial number field 302, a status field 304, a face value field 306, a customer ID field 308, a seller ID field 310 and a merchant bank ID field 312 and may optionally include a traveler's check expiration date field 314 and a periodic fee field 316. A record 320 is established for each traveler's check at issuance. The serial number of the traveler's check is stored in serial number field 302. The status of the check is stored in status field 304. When the check is issued, the status is set to "Uncashed". Later, after the customer has used the check, the status is set to "Cashed". The monetary face value amount is stored in face value field 306. This field includes currency in which the check was issued and the number of units of that currency for which the check was issued.

An identification number that uniquely identifies a customer is stored in customer ID field 308. In a preferred embodiment, the credit card account number used to purchase the check, which uniquely identifies the customer who will pay for the check, is stored in customer ID field 308. However, a number that is unrelated to the credit card account number could be used instead.

An identification number that uniquely identifies the seller that sold the check is stored in seller ID field 310. An identification number that uniquely identifies the merchant bank that presented the check for payment is stored in merchant bank ID field 312. At issuance, this field is set to "Uncashed". Later, when the check is presented for payment, the merchant bank ID is stored.

The optional expiration date field 314 stores a date after which the check is no longer valid. This causes the checks to expire so as to limit periodic charges and otherwise deal with potentially forgotten or lost checks. The credit lock on the underlying account is also lifted when the checks expire. The expiration date may be based on a predetermined period from the date of purchase, such as six months or a year, or on a date specified by the customer, after which the checks will no longer be needed. The optional periodic fee field 316 stores information relating to a periodic fee which is charged on the open availability of the check. The field may indicate that a check is to be charged no periodic fee, a monetary amount of fee, or a percentage (of face value) amount of fee and may also specify the period for which the fee is charged.

An exemplary format of a customer database 226 is shown in FIG. 4. Database 226 includes a plurality of records, such as, for example, records 420a–b. Each record includes a customer ID field 402, a credit card expiration date field 404, a seller ID field 406, an amount of uncleared checks field 408, a credit card lock date field 410 and a lock authorization field 412. Optional expiration date and percentage fee fields, 414 and 416, respectively, may be included. A record 420 is established and maintained for each transaction in which traveler's checks are purchased. An identification number that uniquely identifies the customer who purchased the checks is stored in customer ID field 402. In a preferred embodiment, a credit card account number used to purchase checks, which uniquely identifies the customer who will pay for the checks, is stored in customer ID field 402. Customer name, address and other identifying information may be stored in customer ID field 402, or in an additional field (not shown).

In use, an individual customer might have a plurality of records 420 in database 226. Each transaction in which the customer purchased traveler's checks would generate a record 420. In addition, if a particular customer used more than one credit card, records having different customer ID's would belong to the same customer. Field 402 stores the number of the credit card used in the transaction, while field 404 stores the expiration date of that credit card. Seller ID field 406 stores an identification number that uniquely identifies the seller that handled the transaction.

Field 408 stores the total amount of uncleared checks from the transaction. Initially, this field is set to the total of the face value amounts of the traveler's checks involved in the transaction. As individual traveler's checks are cashed and cleared, the face value of each check cleared is subtracted from this field. Eventually, when all the checks from the transaction have been cleared, this field is set to zero and the record deleted. This field stores an indicator of the currency, as well as the number of units of the currency.

Field 410 stores the date on which the amount of the transaction was locked on the credit card indicated by field 402. Likewise, field 412 stores the lock authorization, which is typically an alpha-numeric code, transmitted from the credit card clearing house.

The optional expiration date field 414 stores a date after which all checks which are still outstanding are no longer valid. This causes the checks to expire as described above. The expiration date may be based on a predetermined period from the date of purchase, such as six months or a year, or on a date specified by the customer, after which the checks will no longer be needed. The optional periodic fee field 416 stored information relating to a periodic fee which is charged on the open availability of the remaining outstanding checks. The field may indicate that a check is to be charged no periodic fee, a monetary amount of fee, or a percentage (of face value) amount of fee and may also specify the period for which the fee is charged.

An exemplary format of a seller database 228 is shown in FIG. 5. The traveler's check issuer may directly sell postpaid traveler's checks, or they may be sold by a reseller, such as a bank or other financial institution. Seller database 228 is used to store information relating to those resellers. Database 228 includes a plurality of records, such as, for example, records 520a–b. Each record includes an ID number field 502, a name field 504, a contact person field 506 and a contact phone number field 508. ID number field 502 stores an identification number that uniquely identifies a seller (bank or other financial institution). Field 504 stores the name of the seller. Field 506 stores the name of a person who is the contact for traveler's checks at the seller and field 508 stores the telephone number of that person.

Figure 6A:
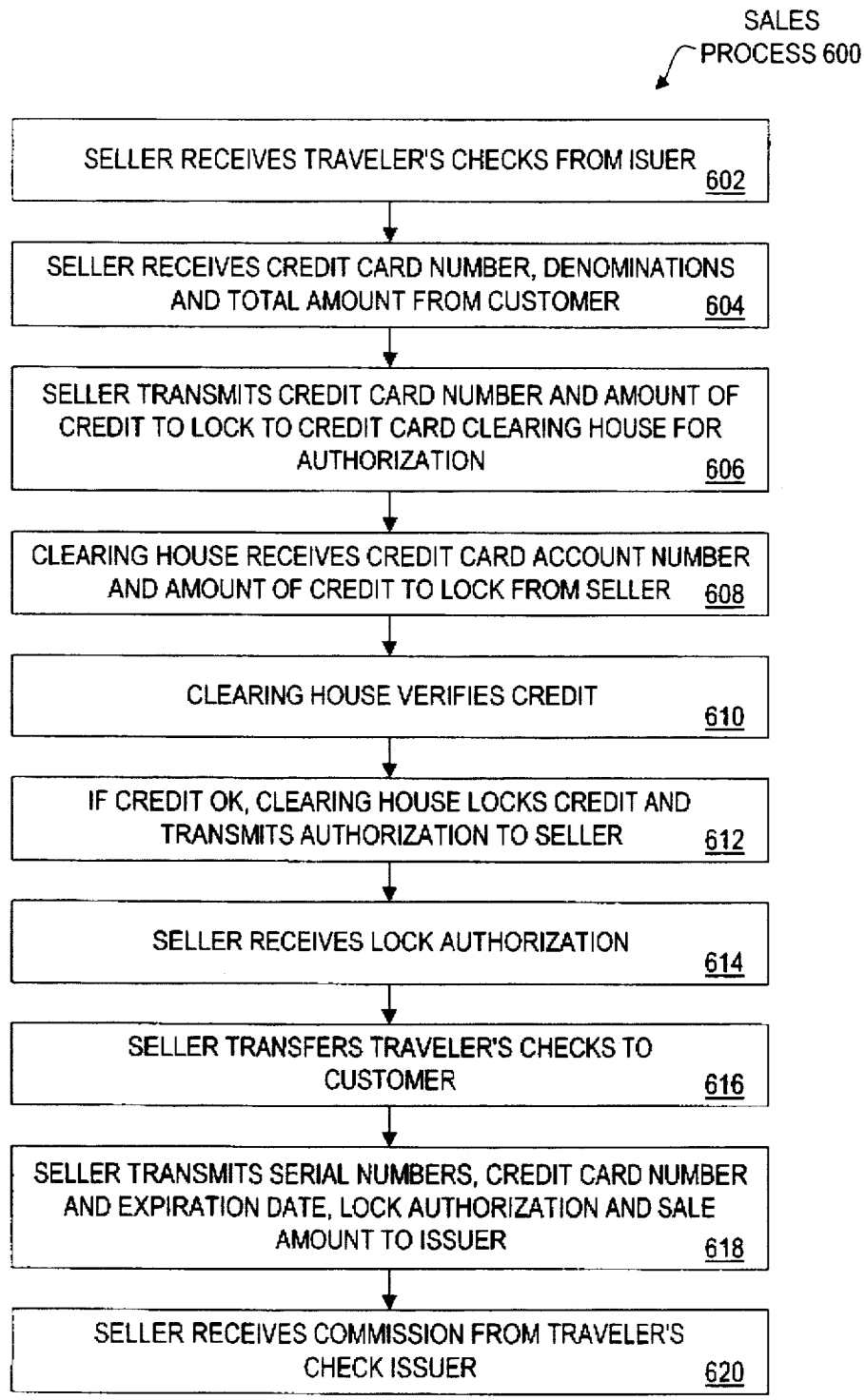
Figure 6B:
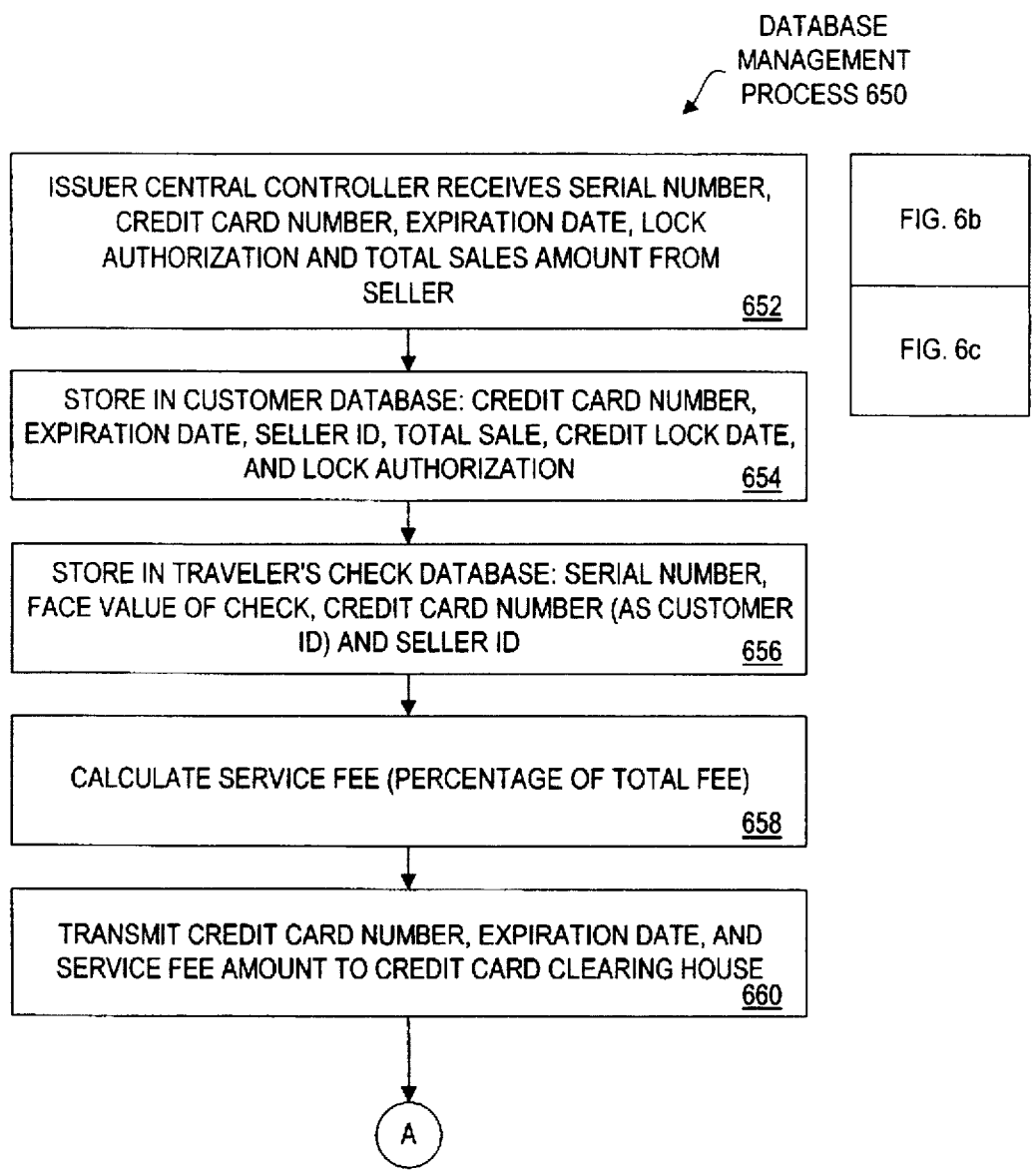
Figure 6C:
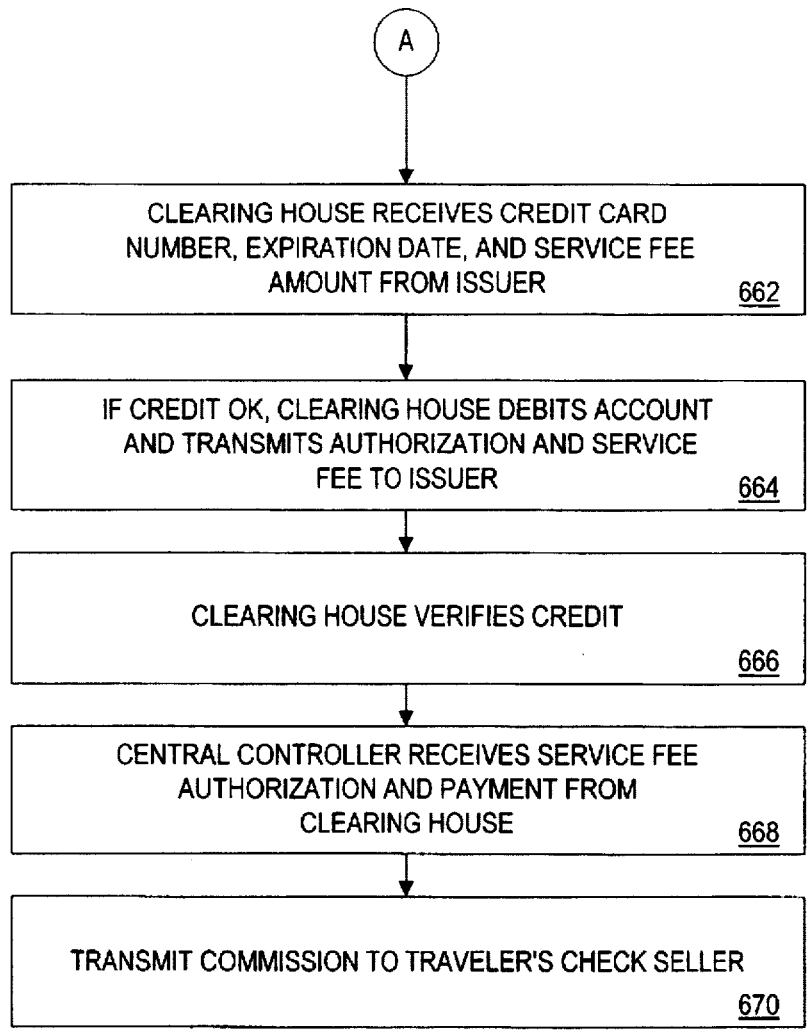

A traveler's check sales process 600, which is implemented in the system of FIG. 2a and uses the databases shown in FIGS. 3 and 4, is shown in FIG. 6. Process 600 begins with step 602, in which a seller receives a quantity of traveler's checks from the issuer. When a customer purchases one or more traveler's checks from the seller, in step 604, the seller receives the credit card account number used to purchase the checks, the denominations of the checks and the total amount of the purchase from the customer. The amount of the purchase is the amount of the credit lock that will be placed on the received credit card account number. In step 606, the seller transmits a message including the credit card account number and the amount of the credit lock to the credit card clearing house for authorization. In step 608, the clearing house receives the message. In step 610, the clearing house accesses the credit line for the identified credit card and verifies that there is sufficient credit. In step 612, if there is sufficient credit, the clearing house places a lock on the identified account and transmits a lock authorization to the seller. In step 614, the seller receives the lock authorization, which typically is a numeric code. In step 616, the seller transfers the traveler's checks to the customer, who is then free to leave. In step 618, the seller transmits a message including the serial numbers of the traveler's checks which were transferred, the number of the credit card used to purchase the checks, the expiration date of the credit card, the lock authorization received from the credit card clearing house and the amount of the sale to the traveler's check issuer. The issuer performs database management process 650 of FIG. 6b, which results in the issuer transmitting a commission payment for the checks to the seller. In step 620, the seller receives the commission payment from the issuer.

Database management process 650, which is implemented in issuer central controller 200 of FIG. 2a and uses the databases shown in FIGS. 3 and 4, is shown in FIG. 6b. Process 650 begins with step 652, in which the central controller belonging to the traveler's check issuer receives the message transmitted by the seller in step 618 of FIG. 6a. The message includes the serial numbers of the traveler's checks which were sold to the customer, the number of the credit card used to purchase the checks, the expiration date of the credit card, the lock authorization received from the credit card clearing house and the total amount of the sale. In step 654, the central controller generates a record in customer database 226 and stores the credit card account number as the customer ID, the expiration date of the credit card, the ID of the seller, the total sales amount as the amount of uncleared checks, the date of the credit lock and the lock authorization. In step 656, the central controller generates one record in traveler's check database 224 for each received check serial number. Each record stores a serial number, the status of the check, which is "Uncashed" at this point, the face value of the check, the credit card account number as the customer ID, the seller ID and the merchant bank ID, which is "Uncashed" at this point. In step 658, the central controller calculates the service fee as a percentage of the total sale. In step 660, the central controller transmits the credit card account number, the expiration date and the service fee amount to the credit card clearing house, in order to charge the service fee amount to the customer's credit card. In step 662, the clearing house receives the information from the issuer. In step 664, the clearing house accesses the credit line for the identified credit card and verifies that there is sufficient credit. If there is sufficient credit in step 666, the clearing house debits the service fee amount to the credit card account and transmits the authorization and the service fee payment to the issuer central controller. In step 668, the central controller receives the service fee authorization and payment. In step 670, the central controller transmits the seller's commission to the seller.

Figure 7A:
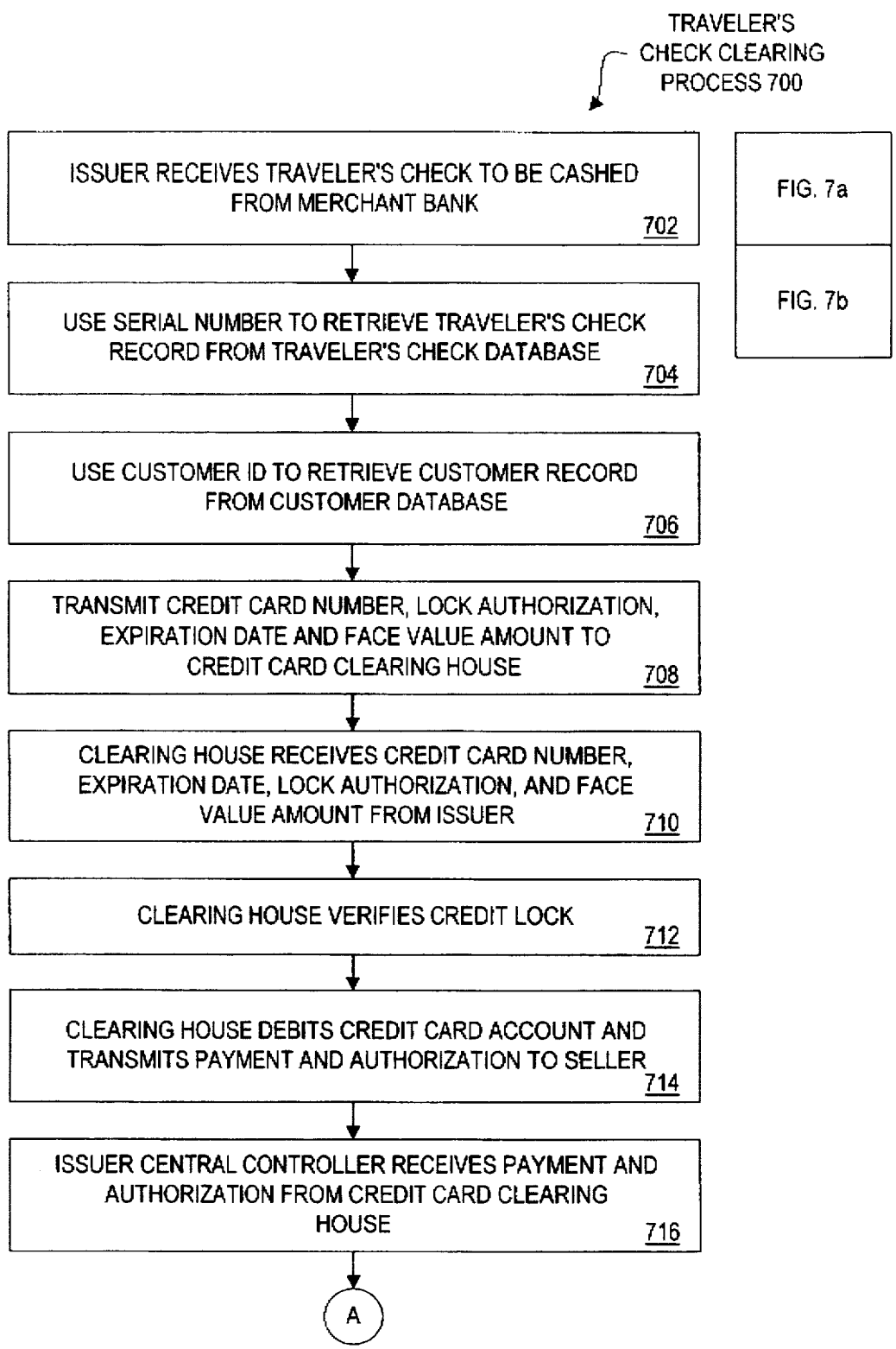
Figure 7B:
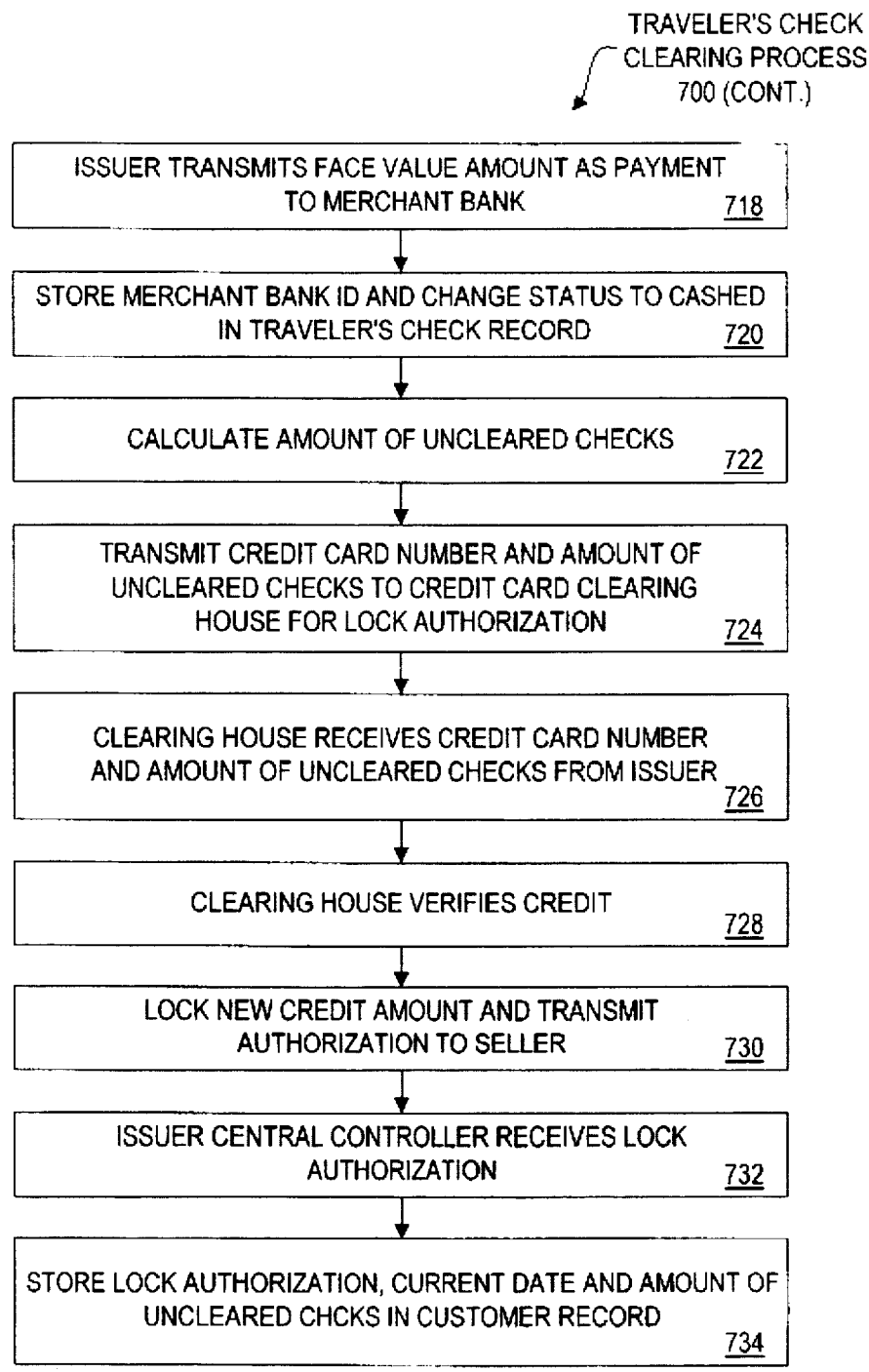

A traveler's check clearing process 700, which is implemented in the system of FIG. 2a and uses the databases shown in FIGS. 3 and 4, is shown in FIGS. 7a–b. Process 700 begins with step 702, in which the issuer receives a traveler's check for clearance from a merchant bank. In step 704, the serial number of the received traveler's check is used to retrieve the corresponding traveler's check record from traveler's check database 224. The retrieved traveler's check record has an entry in its serial number field that matches the serial number of the received traveler's check. In step 706, the contents of the customer ID field of the retrieved traveler's check record are used to retrieve the corresponding customer record from customer database 226. The contents of the customer ID field of the retrieved customer record are the credit card account number used to purchase the received traveler's check. In step 708, the credit card account number, the lock authorization and the expiration date from the retrieved customer record and the face value amount of the check, including the currency, are transmitted to the credit card clearing house. In step 710, the clearing house receives the information from the issuer. In step 712, the clearing house accesses the credit line for the identified credit card and verifies that there is a lock on sufficient credit. In step 714, the clearing house debits the amount of the check to the credit card account and transmits the payment and authorization to the issuer central controller. In step 716, the issuer central controller receives the payment and authorization from the credit card clearing house.

Turning now to FIG. 7b, the remaining steps of process 700 are shown. In step 718, a payment equal to the face value amount of the received check is transmitted to the merchant bank as the payment on the check. In step 720, the ID of the merchant bank is stored in the merchant bank ID field of the retrieved traveler's check record and the contents of the status field of that record are changed to "Cashed". In step 722, the amount of uncleared checks remaining in the retrieved customer record is calculated by subtracting the face value amount of the received check from the contents of the amount of uncleared checks field of the retrieved customer record. In step 724, the credit card account number and the calculated amount of uncleared checks is transmitted to the credit card clearing house. In step 726, the clearing house receives the information from the issuer. In step 728, the clearing house accesses the credit line for the identified credit card and verifies that there is sufficient credit for the new lock. Sufficient credit should always be available, because the new credit lock is always less than the previous credit lock. In step 730, the clearing house adjusts the credit lock to equal the received amount of uncleared checks. The credit card clearing house then transmits a lock authorization to the issuer central controller. In step 732, the issuer central controller receives the lock authorization. In step 734, the central controller stores in the retrieved customer record the received lock authorization in the lock authorization field, the current date in the lock date field and the calculated amount of uncleared checks in the amount of uncleared checks field.

Figure 8:
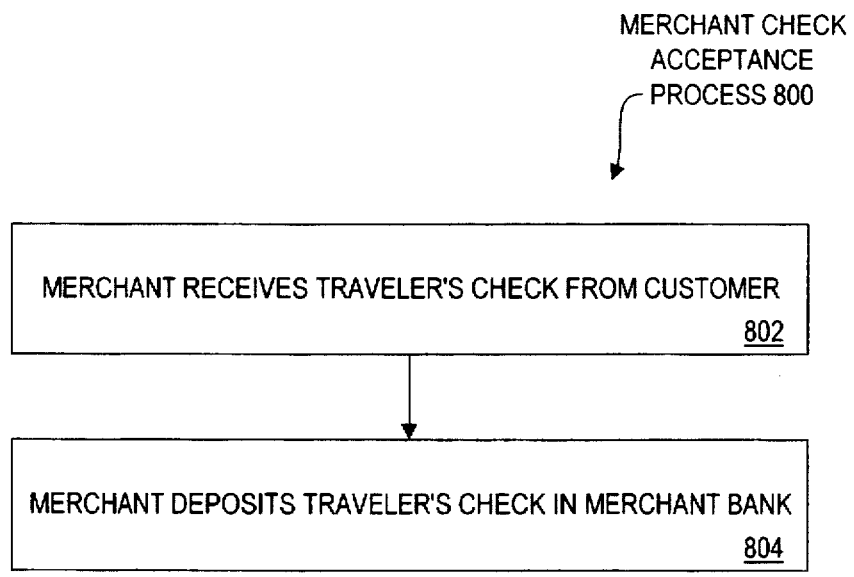

One embodiment of a merchant check acceptance process 800, which is implemented in the system of FIG. 2a, is shown in FIG. 8. The process begins with step 802, in which a merchant receives a traveler's check from a customer. In step 804, the merchant deposits the received check at a merchant bank.

Figure 9:
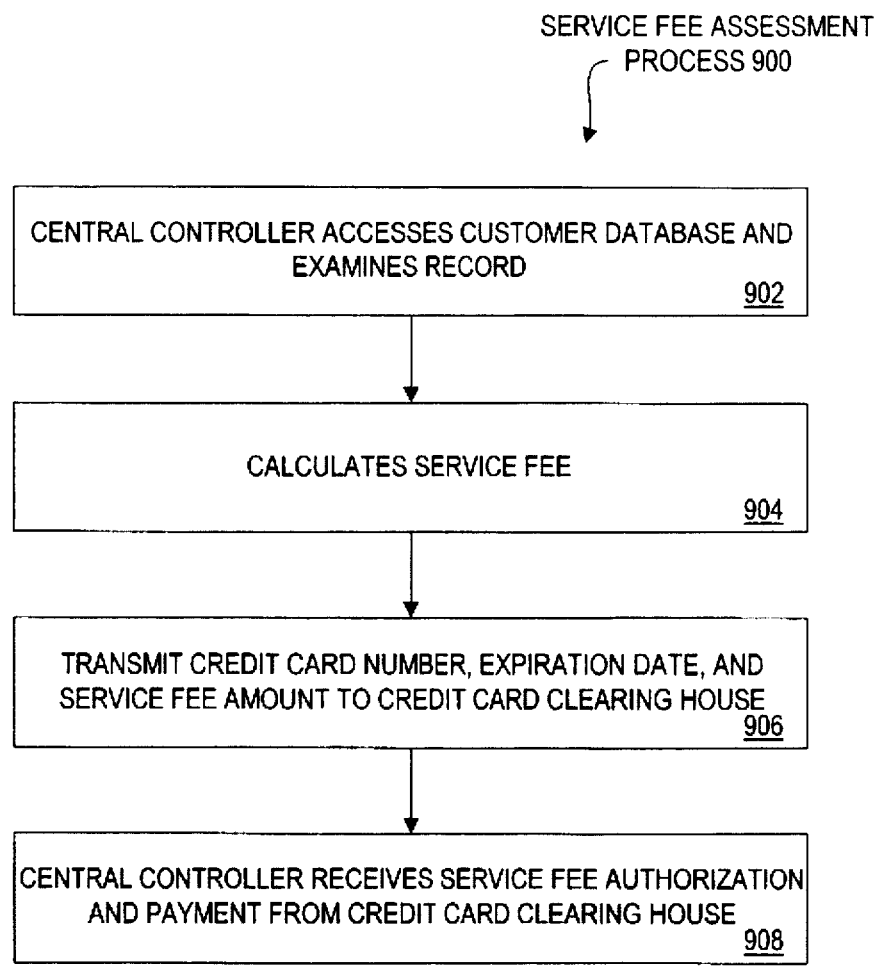

A periodic service fee assessment process 900, which is implemented in the system of FIG. 2a, is shown in FIG. 9. The process begins with step 902, in which the issuer central controller accesses a database for periodic assessment and examines the records of the database. In one embodiment the customer database 226, shown in FIG. 4, is used. In this embodiment, in step 904, the service fee is calculated based on the amount of uncleared checks 408. In step 906, the credit card account number, expiration date of the credit card and the calculated service fee are transmitted to the credit card clearing house. The credit card account number is obtained from customer ID field 402 and the expiration date is obtained from expiration date field 404. In step 908, the service fee authorization and payment is received from the credit card clearing house.

In another embodiment the traveler's check database 224, shown in FIG. 3, is used. In this embodiment, in step 904, the service fee for each check is calculated based on the face value 306 for each check. The credit card account number is obtained from customer ID field 308, while the corresponding record in customer database 226 is accessed to obtain the expiration date.

In one embodiment, all customers are charged periodic service fees on all outstanding uncashed traveler's checks. In other embodiments, periodic service fees may be charged as specified. For example, in one embodiment that uses customer database 226, some customers may be charged a periodic service fee while others are not charged the fee. In this embodiment, optional periodic fee field 416 of customer database 226, shown in FIG. 4, specifies whether a periodic service fee is to be charged. This field may also be used to specify the amount or percentage of the periodic service fee, providing flexibility in charging arrangements.

In one embodiment that uses traveler's check database 224, a periodic service fee may be charged on some traveler's checks, but not on others. In this embodiment, optional periodic fee field 316 of traveler's check database 224, shown in FIG. 3, specifies whether a periodic fee is to be charged. This field may be used to specify the amount or percentage of the periodic service fee, providing flexibility in charging arrangements. As an alternative to using field 316, an existing field, such as status field 304, may be used instead.

Expired traveler's checks may be handled in a similar, periodic manner by comparing the expiration date 314 against a current date. Checks having an expiration date older than the current date are canceled. In a manner substantially identical to the check clearance process described above, the face value of expired checks is subtracted from the amount of uncleared checks in customer database 226. The remaining face value of unexpired, uncashed checks is transmitted along with the credit card number, and lock authorization, to clearinghouse 112. Clearinghouse 112 appropriately updates the lock against the credit card account, placing a new lock for the value of the unexpired, uncashed traveler's checks. The new lock value and authorization number are transmitted from clearinghouse 112 to central controller 200, where the customer and traveler's checks databases, 224 and 226, respectively, are appropriately updated.

Figure 10:
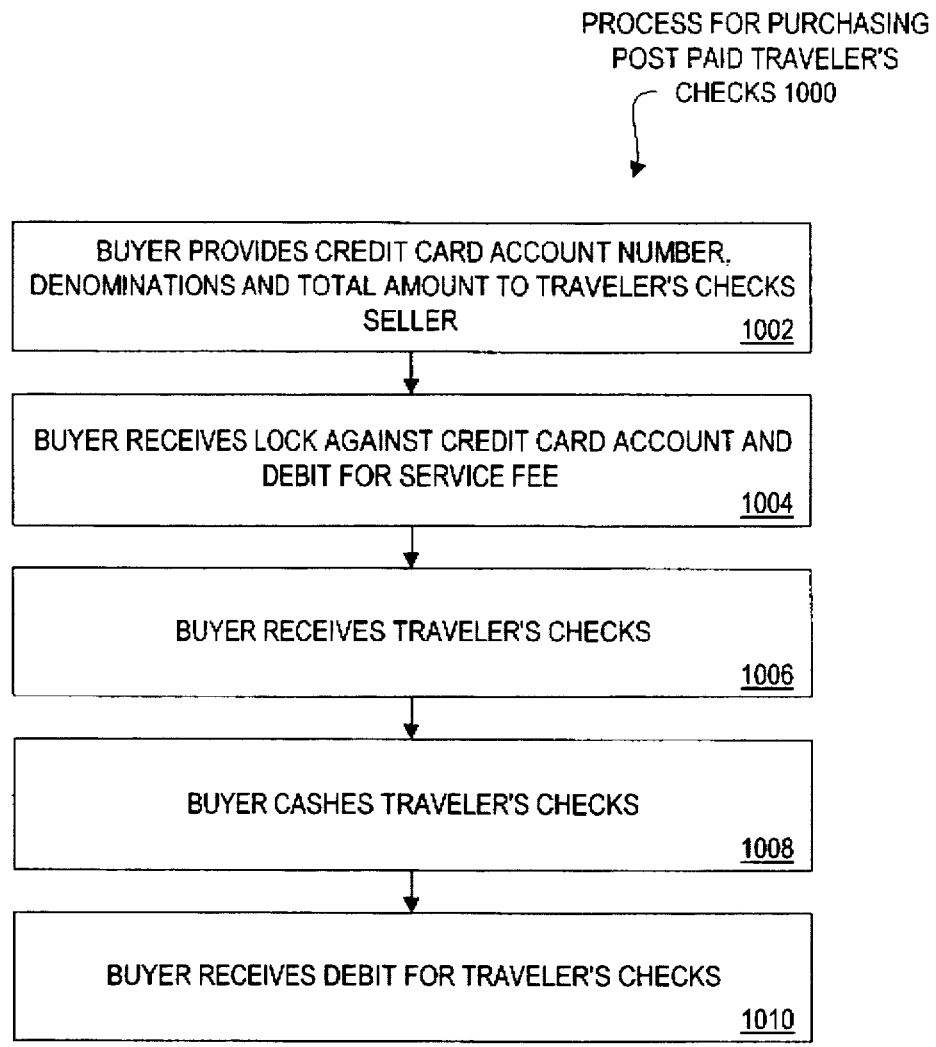

A process for buying postpaid traveler's checks is shown in FIG. 10. The process begins with step 1002, in which a customer provides a credit card account number, denominations and a total amount of traveler's checks purchased to a seller of postpaid traveler's checks. In step 1004, the customer receives a lock against the credit card account for the total amount of traveler's checks purchased and a debit against the credit card account for a service fee. In step 1006, the customer receives the purchased traveler's checks. In step 1008, the customer cashes one or more traveler's checks at a location that accepts traveler's checks, such as a merchant or a bank. In step 1010, the customer receives a debit against the credit card account for the face value amount of the traveler's check cashed.

Postpaid traveler's checks may be insured at the time of purchase. If insured checks are lost or stolen, they are replaced in the same manner as conventional checks. However, if the underlying linked credit card account is no longer valid, which would be the case if the credit card for the linked account were also lost or stolen, the checks would not be replaced unless they could be linked to another valid account.

If a customer or credit provider wants to close a credit card account for which there are outstanding uncashed postpaid checks, the checks must either be returned and voided, or the value of the checks must be paid in full. The latter option essentially converts the postpaid checks to conventional checks. In the event of conversion, the traveler's check database is updated to indicate that the checks have been fully paid.

In the embodiments of the invention shown and described above, a credit lock is placed on the an underlying account for the entirety of the value of the traveler's checks purchased. In another embodiment of the invention, a credit lock is established for only a portion of the value of the checks. The remaining value is paid for by the customer, either in cash, or by an actual charge to a credit card or to the underlying account.

Although a specific embodiment of the present invention has been described, it will be understood by those of skill in the art that there are other embodiments that are equivalent to the described embodiment. Accordingly, it is to be understood that the invention is not to be limited by the specific illustrated embodiment, but only by the scope of the appended claims.

What is claimed is:

1. A method of issuing traveler's checks by a traveler's check seller comprising the steps of:

distributing a plurality of traveler's checks, a face value corresponding to each of said plurality of traveler's checks, said plurality of traveler's checks having a total monetary value;

receiving an account identifier identifying an account;

processing a lock against the account for a lock value based on the total monetary value; and decreasing the lock value placed against the account, the step of decreasing based on said face value of each of said plurality of traveler's checks.

2. The method of claim 1, wherein the decrease of the lock value occurs after a use by a user of said plurality of traveler's checks.

3. The method of claim 1, wherein the receiving step comprises the step of:

receiving the account identifier comprising a credit card account number.

4. The method of claim 3, wherein the processing step comprises the step of:

communicating a request for (a) placing the lock to a credit card clearing house.

5. The method of claim 4, wherein the processing step comprises the steps of:

communicating the lock value and the credit card account number to the credit card clearing house, and receiving, from the credit card clearing house, a verification that the lock comprising the lock value has been placed against the credit card account.

6. The method of claim 5, wherein the distributing step is performed by a reseller of the plurality of traveler's checks.

7. The method of claim 6, further comprising the step of:

communicating, to a database system, information corresponding to the account and information corresponding to at least one of the plurality of traveler's checks.

8. The method of claim 7, wherein each of said plurality of traveler's checks comprising a unique identifier.

9. The method of claim 8, wherein the step of communicating to the database system further comprises the step of:

communicating, to the database system, at least one of:

the unique identifier of each of said plurality of traveler's checks, the credit card account number, the lock verification, and the total monetary value of the plurality of traveler's checks.

10. The method of claim 5, wherein the distributing step is performed by an issuer of the plurality of traveler's checks.

11. The method of claim 10, further comprising the step of:

storing in a database system information relating to the account and information relating to the plurality of traveler's checks.

12. The method of claim 11, wherein each of said plurality of traveler's checks comprises a unique identifier.

13. The method of claim 12, wherein the step of storing in the database system further comprises the step of:

storing at least one of:

the unique identifier of each of said plurality of traveler's checks, the credit card account number, the received lock authorization and the total monetary value of the plurality of traveler's checks to the database system.

14. A method of managing a postpaid traveler's check system comprising the steps of:

providing, to a database stem, information relating to a plurality of traveler's checks, a face value corresponding to each of said plurality of traveler's checks, said plurality of traveler's checks having a total monetary value, the information comprising an account identifier identifying an account against which a lock comprising a lock value has been placed, the lock value based on the total monetary value; and debiting the account while reducing the lock value by an amount based on the face value of each of said plurality of traveler's checks.

15. The method of claim 14, further comprising the steps of:

calculating a first service fee;

charging the first service fee to the identified account; and receiving a payment for the first service fee.

16. The method of claim 15, further comprising the steps of:

communicating an amount based on the face value of the one of said plurality of traveler's checks; and receiving a payment for the amount.

17. A method of managing a postpaid traveler's check system comprising the steps of:

providing, to a database system, information relating to at least one traveler's check that has been distributed to a user, a face value corresponding to each of said plurality of traveler's checks, said plurality of traveler's checks having a total monetary value, the information comprising a credit card account number identifying a credit card account against which a lock comprising a lock value has been placed, the lock value corresponding the total monetary value;

determining first service fee;

charging the first service fee to the identified account;

debiting the account while reducing the lock value by an amount based on the face value of said at least one traveler's check.

18. The method of claim 17, wherein the debiting step comprises the steps of:

communicating an amount based on the face value of said at least one traveler's check; and receiving a payment for the amount.

19. The method of claim 18 further comprising the steps of:

calculating the second service fee;

communicating the second service fee and the credit card account number; and receiving, a payment for the second service fee.

20. A method of buying traveler's checks comprising the steps of:

purchasing, from a seller, a plurality of traveler's checks, a face value corresponding to each of said plurality of traveler's checks, said plurality of traveler's checks having a total value;

providing to the seller an account identifier identifying an account against which a lock will be placed for an amount based on the total value;

cashing at least one of said plurality of traveler's check;

receiving a debit against the account corresponding to the face value of the at least one traveler's check; and receiving a decrease of the lock value, the decrease based on the face value of the at least one of said plurality of traveler's checks.

21. The method of claim 20, wherein the account identifier comprises a credit card account number.

22. A method of clearing post paid traveler's checks comprising the steps of:

receiving a first request for a lock against an account for a lock value in an amount based on a total monetary value of a plurality of traveler's checks issued to a user, a face value corresponding each of said plurality of traveler's checks; and transmitting, in response to the first request, a verification of the lock value against the account;

receiving a second request to decrease the lock value and to debit the account for a second amount based on the face value of at least one of said plurality of traveler's checks, the decrease of the lock value based the face value of the at least one of said plurality of traveler's checks;

debiting the account, responsive to the second request; and decreasing the lock, responsive to the second request.

23. A traveler's check management system comprising:

a memory for storing a database comprising at least one field for storing information corresponding to a plurality of traveler's checks issued to a user, the plurality of traveler's checks having a total monetary value, the information comprising:

a unique serial number corresponding to each of the plurality of traveler's checks, a face value corresponding to each of the plurality of traveler's checks, and an account identifier identifying an account associated with the user; and a processing unit, coupled to the memory, initiating placement of a lock comprising a lock value based on the total monetary value by the financial clearing house against the identified account and decreasing the lock value based on the face value of the at least one of said plurality of traveler's checks.

24. The system of claim 23, wherein said information further comprises:

cashed check information corresponding to a cashing of at least one of the plurality of traveler's checks, the cashed check information comprising the serial number of the at least one traveler's check.

25. A method of issuing and clearing traveler's checks comprising the steps of:

distributing a plurality of traveler's checks, a face value and an expiration date corresponding to each of said plurality of traveler's checks, said plurality of traveler's checks having a total monetary value;

receiving an account identifier identifying an account;

processing a lock against the account for a lock value based on the total monetary value; and decreasing the lock value placed against the account based on said face value of each of said plurality of traveler's checks.

26. The method of claim 25, wherein the decrease of the lock value occurs after a use by a user of said plurality of traveler's checks.

27. The method of claim 25, wherein the decrease of the lock value occurs after the expiration date.

28. The method of claim 25, wherein the distributing step is performed by a reseller of the traveler's checks, the method further comprising:

receiving a verification that a lock corresponding to the lock value has been placed against the account.

29. The method of claim 28, wherein the method further comprises the step of:

communicating, to a database system, information corresponding to the account and information corresponding to the plurality of traveler's checks.

30. The method of claim 29, wherein each of said plurality of traveler's checks comprises a unique identifier.

31. The method of claim 30, wherein the step of communicating to the database system comprises the step of:

communicating, to the database system, at least one of:

the unique identifier of each of said plurality of traveler's check, the account number, the lock verification, and the total monetary value of the plurality of traveler's checks.

32. The method of claim 25, further comprising the step of:

storing in a database system information corresponding to the account and information corresponding to the plurality of traveler's checks.

33. The method of claim 32, wherein each of said plurality of traveler's check comprises a unique identifier.

34. The method of claim 33, wherein the step of storing in the database system further comprises the step of:

storing at least one of:

the unique identifier of each of said plurality of traveler's checks, the account number, the received lock verification and the total monetary value.

35. A method of clearing traveler's checks, comprising the steps of:

providing to a database, information corresponding to a plurality of traveler's checks, a face value corresponding to each of the plurality of traveler's checks, the plurality of traveler's checks having a total monetary value, the information comprising an account identifier identifying an account maintained by a financial institution, and a lock comprising a lock value placed against the account, the lock value based on the total monetary value;

receiving at least one of said plurality of traveler's checks;

retrieving the account identifier corresponding to the account from the database;

transmitting the face value of the received at least one of said plurality of traveler's checks and the retrieved account identifier to the financial institution;

receiving a payment related to the face value of the received traveler's check from the financial institution; and transmitting an authorization to decrease the lock value placed against the account by an amount based on said face value of the at least one of said plurality of traveler's checks.

36. The method of claim 35, wherein the account identifier comprises a credit card account number.

37. A method of issuing and clearing traveler's checks comprising the steps of:

providing, to a database, information relating to a plurality of traveler's checks, a face value corresponding to each of the plurality of traveler's checks, the plurality of traveler's checks having a total monetary value, the information comprising an account identifier identifying an account corresponding to a user;

communicating a request for a lock against the identified account for a lock value based on the total monetary value of the plurality of traveler's checks that were issued to the user;

receiving at least one of said plurality of traveler's checks after a use by the user;

retrieving the account identifier corresponding to the user from the database;

transmitting the face value of the at least one of said plurality of traveler's checks and the retrieved account identifier to the financial clearing house;

receiving a payment related to the face value of the at least one of said plurality of traveler's checks from the financial clearing house; and transmitting an authorization to decrease the lock value placed against the account by an amount based on said face value of the at least one of said plurality of traveler's checks.

38. The method of claim 37, wherein the financial clearing house comprises a credit card clearing house, the account identifier comprises a credit card account number and the communicating step comprises the steps of:

communicating the lock value and the credit card account number to the credit card clearing house, and receiving, from the credit card clearing house, verification that the lock corresponding to the lock value has been placed against the credit card account.

39. The method of claim 37, further comprising the step of:

receiving, from the cleaning house, a verification that the lock corresponding to the lock value has been placed against the account.

40. The method of claim 39, wherein each of said plurality of traveler's checks comprises a unique identifier.

41. The method of claim 40, wherein the step of providing in the database system information relating to the user and the traveler's checks that were distributed comprises the step of:

providing at least one of:

the identifier of each of said plurality of traveler's checks, the account number, the verification, and the total monetary value of the plurality of traveler's checks to the database.

42. The method of claim 41, wherein the providing step comprises the steps of:

providing a first database portion comprising a user identifier; and providing a second database portion comprising the account identifier.

43. The method of claim 42, wherein the retrieving step comprises the steps of:

retrieving, from the first database portion, the user identifier; and retrieving, from the second database portion, the account identifier corresponding to the user.

44. The method of claim 43, further comprising the step of receiving a verification from the financial clearing house that the lock against the identified account has been reduced by said face value of the at least one of said plurality of traveler's checks.

\* \* \* \* \*